United States Patent [19]
Hartinger

[11] Patent Number: 5,861,466
[45] Date of Patent: Jan. 19, 1999

[54] SYNERGISTIC IMPROVEMENT IN VINYL ESTER RESIN SHELF LIFE

[75] Inventor: Danny G. Hartinger, Columbus, Ohio

[73] Assignee: Ashland Inc., Russell, Ky.

[21] Appl. No.: 831,104

[22] Filed: Apr. 1, 1997

Related U.S. Application Data

[63] Continuation of Ser. No. 405,055, Mar. 16, 1995, abandoned.

[51] Int. Cl.$^6$ .................................................. C08F 283/00
[52] U.S. Cl. ........................ 525/531; 525/529; 525/530; 525/533; 525/922
[58] Field of Search ................................... 525/529, 530, 525/531, 533, 922

[56] References Cited

U.S. PATENT DOCUMENTS

| | | | |
|---|---|---|---|
| 2,633,458 | 3/1953 | Shokal | 260/45.2 |
| 3,256,226 | 6/1966 | Fekete et al. | 260/23.5 |
| 3,373,075 | 3/1968 | Fekete et al. | 525/922 |
| 3,408,422 | 10/1968 | May | 260/837 |
| 3,535,403 | 10/1970 | Holub et al. | 525/922 |
| 3,683,045 | 8/1972 | Baldwin et al. | 260/837 |
| 3,753,755 | 8/1973 | Olson | 525/922 |
| 3,819,551 | 6/1974 | Hokamura et al. | 525/94 |
| 3,980,483 | 9/1976 | Nisikubo et al. | 525/531 |
| 4,097,994 | 7/1978 | Reaville et al. | 525/530 |
| 4,336,359 | 6/1982 | Messick | 525/531 |
| 4,407,991 | 10/1983 | Messick | 524/83 |
| 4,413,105 | 11/1983 | Koenig | 96/115 R |
| 4,564,646 | 1/1986 | Nishigaki et al. | 525/922 |
| 4,703,338 | 10/1987 | Sagami et al. | 525/922 |
| 4,789,620 | 12/1988 | Sasaki et al. | 430/280 |
| 4,837,280 | 6/1989 | Awaji et al. | 525/502 |
| 4,888,269 | 12/1989 | Sato et al. | 430/280 |
| 5,034,437 | 7/1991 | Wykowski et al. | 523/454 |
| 5,082,598 | 1/1992 | Awaji et al. | 525/518 |

FOREIGN PATENT DOCUMENTS 3528461  2/1987  Germany .

OTHER PUBLICATIONS

Database WPI Derwent Publications, Ltd., London, GB Abstract No. 87–050930, DE, A .

*Primary Examiner*—Randy Gulakowski
*Attorney, Agent, or Firm*—Mary E. Picken; Martin Connaughton

[57] ABSTRACT

Vinyl ester resins processed until low epoxy values are reached are storage stable for two weeks at 54° C. (130° F.). Adding a copper salt inhibitor also provides two weeks storage stability at 54° C. (130° F.). A synergistic effect is observed if both low epoxy values are reached and copper naphthenate inhibitor is used, extending shelf life stability to two months at 54° C. (130° F.).

30 Claims, No Drawings

SYNERGISTIC IMPROVEMENT IN VINYL ESTER RESIN SHELF LIFE

This application is a continuation of application Ser. No. 08/405,055 filed on Mar. 16, 1995 now abandoned.

BACKGROUND OF THE INVENTION

Vinyl ester resins are known for their excellent corrosion resistance and physical strength. They are used when reacted with unsaturated monomers, in the manufacture of boats, windmill blades, chemical resistant storage tanks and pipes as well as ducting to handle chemical fumes. Liquid thermosettable vinyl ester resins are known to have a limited shelf life. Typically they must be stored in temperature controlled environments at 25° C. (77° F.) and must be used up within 3 to 6 months or they will polymerize into a solid in their containers and become unusable. Past efforts have focused on the use of inhibitor additives to improve shelf life without adversely affecting the catalyzed gel times of the vinyl ester. Typical shelf life enhancing inhibitors include phenothiazine (U.S. Pat. No. 3,683,045), copper naphthenate (JP 53,111,397), and certain imidizole compounds (U.S. Pat. No. 5,034,437, EP 436,921 and JP 3,103,446). Other shelf life enhancing inhibitors include certain hydroxylamines (U.S. Pat. No. 3,408,442), oxalic acid (U.S. Pat. No. 4,407,991), maleic anhydride (JP 1,240,509), and certain chlorinated nitrophenol compounds (U.S. Pat. No. 4,413,105).

SUMMARY OF THE INVENTION

This invention is the discovery that esterifying a vinyl ester to a very low epoxy value greatly increases its storage life. This invention is also the discovery of a synergistic improvement in shelf life through the addition of small quantities of copper naphthenate to a vinyl ester resin esterified to a very low epoxy value.

DESCRIPTION OF INVENTION

Vinyl ester resins are described by Bowen in U.S. Pat. Nos. 3,066,112 and 3,179,623 wherein monocarboxylic acids, such as acrylic acid and methacrylic acid, are reacted with polyepoxide resins. In U.S. Pat. No. 3,367,992 Bearden describes vinyl esters derived from dicarboxylic acid half esters of hydroxyalkyl acrylates or methacrylates with polyepoxide resins. Vinyl ester resins based on epoxy novolac resins are described in U.S. Pat. No. 3,301,740 by Fekete et al. In U.S. Pat. No. 3,256,226 Fekete et al describe vinyl esters prepared from polyepoxides reacted with dicarboxylic acids as well as monofunctional carboxylic acids.

Other multifunctional compounds containing groups which are reactive with an epoxide group, such as an amine, mercaptan, phenolic hydroxyl and the like may be used in addition to or in place of the dicarboxylic acid. All of the above-described resins, which contain the characteristic linkages

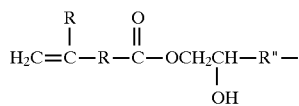

with terminal, polymerizable vinyl groups are classified as vinyl ester resins.

Any of the known polyepoxide resins may be employed in the preparation of the vinyl ester resins of this invention. Useful polyepoxides are glycidyl polyethers of both polyhydric alcohols and polyhydric phenols, epoxy novolacs, epoxidized fatty acids or drying oil acids, epoxidized diolefins, epoxidized diunsaturated acid esters as well as epoxides of unsaturated polyesters, as long as they contain more than one oxirane group per molecule. Preferred polyepoxides are glycidyl polyethers of polyhydric alcohols or polyhydric phenols having weights per epoxide group of about 70 to 2000. Most preferred are the glycidyl polyethers of polyhydric alcohols and polyhydric phenols having epoxy equivalent weights of 150 to 1000. The polyepoxide resins are characterized by the presence of more than one epoxide group per molecule.

Unsaturated monocarboxylic acids include acrylic acid, methacrylic acid, halogenated acrylic acid, halogenated methacrylic acid, cinnamic acid and mixtures thereof. Also included within the term "unsaturated monocarboxylic acids" are the hydroxyalkyl acrylate or methacrylate half esters of dicarboxylic acids as described in U.S. Pat. No. 3,367,992 wherein the hydroxyalkyl group preferably has from 2 to 6 carbon atoms. In the practice of this invention an excess amount of acid is used relative to the amount of polyepoxide.

Polybasic carboxylic acids and anhydrides that may also be employed can be ethylenically unsaturated dicarboxylic acids such as maleic acid, maleic anhydride, fumaric acid and itaconic acid. In addition, dicarboxylic acids free of ethylenic unsaturation such as phthalic acid, isophthalic acid and adipic acid may also be employed as reactants with the epoxides.

Vinyl polymerization inhibitors used during processing, such as hydroquinone (HQ), mono-t-butyl hydroquinone (MTBHQ) and t-butyl catechol (TBC) are advantageously added to prevent premature polymerization during the preparation of the vinyl ester resin. Preferably, the vinyl polymerization inhibitor is included in the reaction mixture at a concentration of about 0.005 to about 0.04 percent by weight based on the total weight of the reactants.

In the process of this invention it is advantageous to exclude the shelf life stability inhibitors, like phenothiazine and copper napthenate, during the esterification reaction. These specialized inhibitors can lead to unstable reaction conditions during processing which may cause the vinyl ester resin to gel inside the reactor.

In preparing the vinyl ester resin, the polyepoxide(s) resins are charged to the reactor and may be reacted first with bisphenols or dibasic carboxylic acids. Next the monocarboxylic acid(s) and polymerization inhibitor(s) are charged and the reactants heated to a suitable reaction temperature between room temperature and about 150° C., preferably between 110° C. and 130° C. Acid equivalent to epoxide equivalent ratios typically range from 0.99 to 1.25, preferably from 1.01 to 1.15. If desired a diluent may be provided in the reaction mixture. Non-reactive diluents may be employed such as toluene, xylene and the like. Preferably a copolymerizable diluent such as styrene, methyl methacrylate or diallyl phthalate is selected as the diluent since the diluent may be used as the copolymerizable carrier after completion of the esterification reaction. Typically the polyepoxide(s) resins and carboxylic acid(s) are catalytically esterified to a final carboxylic acid content of 1% (on a 100% plastic basis), which corresponds to an acid value of approximately 10 units by standard titration techniques (ASTM method D1639-90).

In the process of this invention the vinyl ester resin is reacted (esterified) until a very low epoxy value is reached, preferably from 0.0001 to 3.0, as measured by standard titiation techniques. It is also advantageous to the process of this invention to provide excess carboxylic acid, preferably 5% to 15% excess acid equivalents to epoxide equivalents. At the epoxy value endpoint, the resin is blended with copolymerizable monomer(s) to 40 to 80 weight percent vinyl ester and from 60 to 20 weight percent of the copolymerizable monomer(s). Suitable monomers include vinyl and allylic aromatic compounds such as styrene, vinyl toluene, divinyl benzene and diallyl phthalate. Other useful monomers include the esters of saturated alcohols and glycols such as methyl, ethyl and isopropyl alcohol, along with ethylene glycol, diethylene glycol, and hexanediol with acrylic acid or methacrylic acid; vinyl acetate, diallyl maleate, dimethylallyl fumarate; mixtures of the same and all other monomers which are capable of copolymerizing with the vinyl ester resin.

Among the useful shelf life stability inhibitors are copper salts. Copper naphthenate is available commercially as an 8% solution in petroleum distillates and is preferably used as a shelf life stabilizer at a concentration of from 5 to 100 parts per million. Higher amounts can be used, but may have a deleterious effect upon the gel time. In the process of this invention the addition of small quantities of copper naphthenate to a vinyl ester resin esterified to a very low epoxy value displayed a synergistic improvement in shelf life stability. The stabilizing agent is usually added to the prepared resin after admixture with the vinyl monomer.

Catalysts that may be used for the curing or polymerization are preferably the peroxide and hydroperoxide catalysts such as benzoyl peroxide, lauroyl peroxide, cumene hydroperoxide, t-butyl hydroperoxide, methyl ethyl ketone peroxide (MEKP) or t-butyl perbenzoate. The amount of the catalyst added can vary, preferably from 0.1 percent to about 5 percent by weight of the resin phase.

Preferably, the cure of the resin can be initiated at room temperature by the addition of accelerating agents or promoters, such as lead, potassium or cobalt naphthenate, N,N-dimethyl aniline or N,N-dimethyl-p-toluidine, usually in concentrations ranging from 0.1 to 5.0 weight percent. The promoted/catalyzed composition of resin and monomer, when uninhibited, will usually be converted to at least a gel state in a few minutes and cured to a solid state in 30 minutes to one or two hours. That time will vary widely depending upon the particular vinyl ester resins and vinyl monomer used, the catalyst and promoter system employed and its concentration, the temperature and other factors.

It is an advantage of this invention that the shelf life stability of a vinyl ester resin can be dramatically improved through a change in processing techniques; thus precluding the need for adding expensive stabilizing inhibitors to the resin. Further benefit can be obtained from the addition of stabilizing inhibitors and a synergistic improvement in shelf life stability was noted when small amounts of copper naphthenate were added to a vinyl ester resin esterified to a very low epoxy value.

The benefits and advantages of the invention and the best mode for carrying out the same as illustrated in the following examples wherein all parts and percents are by weight and all units are in the metric system unless otherwise specified. All references mentioned herein are expressly incorporated by reference.

The following vinyl esters thinned in styrene were used:

EXAMPLE A (Standard Process)

One mole of bisphenol A was catalytically reacted with two moles of diglycidylether of bisphenol A at 150° C. for two hours under atmospheric conditions. This yielded a polyepoxide resin having an epoxide equivalent weight of 500 which was subsequently cooled to 130° C. Next, two moles of methacrylic acid and 180 ppm of hydroquinone (based on finished product) were added under an air sparge and esterified at 120° C. until an acid value less than 10 units was recorded. The vinyl ester resin was then cooled to 110° C. and 0.05 moles of maleic anhydride were added. The vinyl ester resin was allowed to continue esterifying for 15 minutes at these conditions before thinning with styrene monomer to 65% non-volatiles and cooling to room temperature. This product is the control.

EXAMPLE B (Processed to Low Epoxy Value)

This vinyl ester resin was prepared the same way as Example A, except that 2.26 moles of methacrylic acid were used and the vinyl ester resin was esterified to an epoxy value less than two units before cooling to 110° C. and adding maleic anhydride. This product was thinned in styrene monomer to 65% non-volatiles and cooled to room temperature.

The liquid properties for Examples A and B are listed in Table 1:

TABLE 1

| LIQUID PROPERTIES | | |
|---|---|---|
| | Example A | Example B |
| % Non volatiles[1] | 64.6 | 64.4 |
| Viscosity (cps)[2] | 2,650 | 2,810 |
| Acid Value[3] | 13.3 | 18.3 |
| Epoxy Value[4] | 7.3 | 1.1 |

[1]Based on ASTM method D 1644-88
[2]Based on ASTM methods D 2393-86 and D 1824-90
[3]Based on ASTM method D 1639-90
[4]Based on ASTM method D 1652-90

An 8% copper naphthenate solution in petroleum spirits was then blended into both vinyl ester resins at 0 ppm, 5 ppm, and 10 ppm, concentrations. These vinyl ester resins were then compared for gel time properties at 25° C. and 82° C., as well as shelf life stability at 54° C. See Tables 2 and 3.

TABLE 2

| | GEL TIME DATA | | | | | |
|---|---|---|---|---|---|---|
| | Copper | 25° C. Gel[5] | | | 82° C. Gel[6] | | |
| | Naphthenate (ppm) | Gel (min) | Peak (min) | Exo (°C.) | Gel (min) | Peak (min) | Exo (°C.) |
| Example A | 0 | 5.7 | 11.3 | 167 | 10.5 | 13.5 | 192 |
| Example A | 5 | 5.8 | 11.7 | 175 | 9.3 | 12.2 | 185 |
| Example A | 10 | 5.6 | 11.3 | 167 | 8.2 | 11.7 | 191 |
| Example B | 0 | 8.0 | 13.0 | 174 | 13.3 | 16.5 | 191 |
| Example B | 5 | 5.6 | 10.3 | 171 | 9.4 | 12.6 | 191 |
| Example B | 10 | 5.6 | 10.5 | 173 | 9.2 | 12.5 | 193 |

[5]Gel time at 25° C. (77° F.)

One hundred grams of sample is removed from a jar kept in a constant temperature bath and weighed into a 6 oz paper cup. 0.1 grams of dimethyl aniline and 0.3 grams of 6 percent cobalt naphthenate in petroleum spirits are then mixed in thoroughly. 1.5 grams of 60 percent methyl ethyl ketone peroxide (MEKP) in dimethyl phthalate is added and mixed thoroughly for one minute before placing the cup onto a T-cam gelometer. The thermocouple and the spindle are immersed. The gelometer is started at 1.5 minutes after the catalyst addition and the time/temperature recorder is started at 2.0 minutes after the catalyst addition. When the product gels, the T-cam is stopped from oscillating which triggers the gelometer timer to stop. This time plus 1.5 minutes is the gel time. After the cure and exotherm are complete the chart recorder paper is removed and the time is measured off the chart from start to the maximum exotherm temperature. This time plus 2.0 minutes is the peak time, and the peak exotherm temperature is recorded off the chart as well.

6) Gel time at 82° C. (180° F.)

0.5 grams of benzoyl peroxide are mixed with 0.5 grams of styrene in a 6 oz paper cup. 50 grams of sample are weighed in and mixed for one minute before pouring into two test tubes to a level of 3 inches. The thermocouple probes are inserted into the sample and allowed to stand 10 minutes to remove air bubbles. The test tubes are placed in a constant temperature bath maintained at 82° C. (180° F.) and the chart recorder started. After the catalyzed sample is cured and the exotherm expired, the chart paper is removed and measured for gel time and peak time as well as the peak exotherm temperature. The gel time is defined as the time from when the resin has increased in temperature from 66° C. (150° F.) to 88° C. (190° F.). The peak time is defined as the time from when the resin has increased from 66° C. (150° F.) to where the peak exotherm temperature occurred. The peak exotherm temperature is recorded off the chart as well.

TABLE 3

54 C.° SHELF LIFE STABILITY (Days)[7]

| | Copper Naphthenate Level | | |
|---|---|---|---|
| | 0 ppm | 5 ppm | 10 ppm |
| Example A | 12 | 18 | 22 |
| Example B | 19 | 54 | 57 |

[7]Stability at 54° C. (130° F.)

100 grams of sample are weighed into 4 oz glass jars, sealed, and placed in an air circulated oven maintained at 54° C. (130° F.). Sample stability was checked daily by inverting the jars and observing for a layer of solid at the bottom of the jar or whether the sample appears stringy in consistency.

As shown in Table 3 Example A, having an epoxy value of 7.3 units, gelled after 12 days of storage while Example B having an epoxy value of 1.1 units, did not gel until 19 days; a 58% improvement. By comparison, the addition of 5 ppm and 10 ppm of copper naphthenate improved the shelf life by 50% and 83% respectively.

Even more noteable was the synergistic 350% and 375% increase in stability when 5 ppm and 10 ppm copper naphthenate were added to Example B, having a 1.1 units epoxy value. With 2 months shelf life stability at 130° F., vinyl ester resins would no longer need to be transported in refrigerated trucks or containers, nor would the majority of customers need to store their vinyl ester resins in temperature controlled environments.

I claim:

1. A thermosettable vinyl ester resin composition having improved shelf life stability at 130 degrees F. (54 degrees C.) comprising the reaction product of
   a) a polyepoxide resin having an epoxide equivalent weight of 70 to 2000, and
   b) 5–15% excess unsaturated monocarboxylic acid equivalents to epoxide equivalents, said reaction product having an epoxy value less than or equal to 3 units as measured by ASTM D 1652-90, said reaction occurring in the presence of esterification catalyst followed by addition of copper naphthenate to said vinyl ester reaction product after processing.

2. The composition of claim 1 wherein said vinyl ester resin has a final acid value 1 to 50 units as measured by ASTM D1639-90 greater than said epoxy value units.

3. The composition of claim 2 wherein said vinyl ester resin has a final acid value 5 to 15 units greater than said epoxy value units.

4. The composition of claim 1 wherein said polyepoxide resin has an epoxide equivalent weight of 150 to 1,000.

5. The composition of claim 1 wherein said polyepoxide resin is selected from the group of epoxidized polyhydric alcohols, epoxidized polyhydric phenols, epoxidized novolacs, epoxidized fatty acids, epoxidized drying oils, epoxidized diolefins and epoxidized diunsaturated acid esters of unsaturated polyesters.

6. The composition of claim 1 wherein said polyepoxide resin is bisphenol epoxy resin or novolac epoxy resin.

7. The composition of claim 1 wherein said polyepoxide resin is the diglycidylether of bisphenol A.

8. The composition of claim 1 wherein said unsaturated monocarboxylic acid is selected from acrylic acid, methacrylic acid, halogenated acrylic acid, halogenated methacrylic acid, and the hydroxyalkyl acrylate or methacrylate half esters of dicarboxylic acids wherein the hydroxyalkyl group has from 2 to 6 carbon atoms.

9. The composition of claim 1 wherein said unsaturated monocarboxylic acid is methacrylic acid.

10. The composition of claim 1 further comprising dicarboxylic acids, acid anhydrides, ethylenically unsaturated dicarboxylic acids, or ethylenically unsaturated acid anhydrides.

11. The composition of claim 10 wherein said ethylenically unsaturated anhydride is maleic anhydride.

12. The composition of claim 1 further comprising a copolymerizable monomer selected from the group of styrene vinyl toluene, divinyl benzene and diallyl phthalate.

13. The composition of claim 1 wherein said vinyl ester resin is the reaction product of diglycidyl ether of bisphenol A, methacrylic acid and maleic anhydride.

14. The composition of claim 1 wherein the epoxy value is less than or equal to 2 units.

15. A process of preparing a vinyl ester resin with excellent shelf life stability comprising the steps of combining a polyepoxide resin having an epoxide equivalent weight of 70 to 2000 with 5–15% excess monocarboxylic acid equivalents to epoxide equivalents and esterification catalyst and reacting until an epoxy value less than or equal to 3 units as measured by ASTM D 1652-90 is reached and recovering a product containing active esterification catalyst.

16. The process of claim 15 wherein said vinyl ester resin has a final acid value 1 to 50 units as measured by ASTM D1639-90 greater than said epoxy value units.

17. The process of claim 16 wherein said vinyl ester resin has a final acid value 5 to 15 units greater than said epoxy value units.

18. The process of claim 15 wherein said polyepoxide resin has an epoxide equivalent weight of 150 to 1,000.

19. The process of claim 15 wherein said polyepoxide resin is selected from the group of epoxidized polyhydric alcohols, epoxidized polyhydric phenols, epoxidized novolacs, epoxidized fatty acids, epoxidized drying oils, epoxidized diolefins and epoxidized diunsaturated acid esters of unsaturated polyesters.

20. The process of claim 15 wherein said polyepoxide resin is bisphenol or novolac epoxy resins.

21. The process of claim 15 wherein said polyepoxide resin is the diglycidylether of bisphenol A.

22. The process of claim 15 wherein said unsaturated monocarboxylic acid is selected from acrylic acid, methacrylic acid, halogenated acrylic acid, halogenated methacrylic acid, and hydroxyalkyl acrylate or methacrylate half esters of dicarboxylic acids wherein said hydroxyalkyl group has from 2 to 6 carbon atoms.

23. The process of claim 15 wherein said unsaturated monocarboxylic acid is methacrylic acid.

24. The process of claim 15 further comprising dicarboxylic acids, acid anhydrides, ethylenically unsaturated dicarboxylic acids, or ethylenically unsaturated acid anhydrides.

25. The process of claim 24 wherein said ethylenically unsaturated anhydride is maleic anhydride.

26. The composition of claim 15 further comprising copolymerizable monomers selected from the group of styrene, vinyl toluene, divinyl benzene and diallyl phthalate.

27. The process of claim 15 further comprising shelf life stability inhibitors.

28. The process of claim 27 wherein said shelf life stability inhibitor is a copper salt.

29. The process of claim 15, wherein said vinyl ester resin is the reaction product of diglycidylether of bisphenol A, methacrylic acid and maleic anhydride.

30. The process of claim 15 wherein said epoxy value is less than or equal to 2 units.

* * * * *